United States Patent
Gaspard et al.

(10) Patent No.: US 7,398,928 B2
(45) Date of Patent: Jul. 15, 2008

(54) CODED TARGET AND PHOTOGRAMMETRY METHOD USING SUCH TARGETS

(75) Inventors: Francois Gaspard, Les Ulis (FR);
Sylvie Naudet, Palaiseau (FR); Eric Noirfalise, Clermont (FR); Patrick Sayd, Villebon S/ Yvette (FR)

(73) Assignee: Commissariat a l'Energie Atomique, Paris (FR)

( * ) Notice: Subject to any disclaimer, the term of this patent is extended or adjusted under 35 U.S.C. 154(b) by 527 days.

(21) Appl. No.: 10/530,466

(22) PCT Filed: Oct. 21, 2003

(86) PCT No.: PCT/FR03/50101

§ 371 (c)(1),
(2), (4) Date: Apr. 6, 2005

(87) PCT Pub. No.: WO2004/040236

PCT Pub. Date: May 13, 2004

(65) Prior Publication Data

US 2006/0007452 A1 Jan. 12, 2006

(30) Foreign Application Priority Data

Oct. 24, 2002 (FR) .................. 02 13303

(51) Int. Cl.
*G06K 7/10* (2006.01)
*G06K 19/06* (2006.01)
(52) U.S. Cl. ............. 235/462.03; 235/454; 235/462.04; 235/494

(58) Field of Classification Search ................. 235/454, 235/462.03, 462.04, 494
See application file for complete search history.

(56) References Cited

U.S. PATENT DOCUMENTS

| 3,409,760 | A | * | 11/1968 | Hamisch | 235/494 |
| 3,418,456 | A | * | 12/1968 | Hamisch et al. | 235/454 |
| 5,260,556 | A | * | 11/1993 | Lake et al. | 235/494 |
| 5,477,012 | A | * | 12/1995 | Sekendur | 178/18.09 |
| 5,607,187 | A | * | 3/1997 | Salive et al. | 235/462.01 |
| 6,219,434 | B1 | * | 4/2001 | Saporetti et al. | 382/100 |
| 6,556,722 | B1 | * | 4/2003 | Russell et al. | 382/291 |

FOREIGN PATENT DOCUMENTS

| DE | 42 05 406 | 9/1993 |
| DE | 196 32 058 | 3/1998 |
| DE | 197 33 466 | 2/1999 |
| EP | 0 917 081 | 5/1999 |

* cited by examiner

*Primary Examiner*—Steven S Paik
*Assistant Examiner*—Christle I Marshall
(74) *Attorney, Agent, or Firm*—Oblon, Spivak, McClelland, Maier & Neustadt, P.C.

(57) ABSTRACT

A coded target used in photogrammetry, the target being circular and including at least two concentric coding rings with at least two equal angular sectors, arranged around a central area including a central disk with a uniform color surrounded by a ring with a complementary color, itself surrounded by a ring the same color as the central disk. A photogrammetry process automatically detects and identifies targets.

9 Claims, 8 Drawing Sheets

CODED TARGET AND PHOTOGRAMMETRY METHOD USING SUCH TARGETS

CROSS-REFERENCE TO RELATED APPLICATIONS

This application is a national stage of PCT application PCT/FR03/50101, filed on Oct. 21, 2003, and claims priority to French patent application FR02/13303, filed on Oct. 24, 2002.

TECHNICAL DOMAIN

This invention relates to coded targets used in photogrammetry and a photogrammetry method using such specific coded targets.

STATE OF PRIOR ART

The technical domain of the invention is photogrammetry and therefore it concerns determination of the dimension and the position of objects in a scene making use of measurements made on photographs of these objects on which coded targets are placed.

Many photogrammetry applications make use of targets that are placed in the observed scene and enable very precise measurements of the position of a point in the different available views. In order to achieve greater automation, some targets called coded targets may contain information so that they can be uniquely identified.

A first document reference [1] at the end of the description, gives examples of coded targets developed to make measurements in three dimensions. These targets may or may not be circular and have characteristics that facilitate image capture and processing: for example a central circle and coding points.

A second document reference [2] also gives examples of coded targets.

A third document reference [3] describes coded targets containing concentric circles, the inner circle being black, and the outer circle being white with a black border. Binary coding of a target consists of small black circles located between the inner circle and the outer circle.

A fourth document reference [4] describes a method by which a camera installed on a robot can be located from a target composed of two circles projecting into ellipses in the image. This method is explicitly based on knowledge of the diameters of the circles and the so-called internal camera parameters (calibrated case). The code associated with the targets is related to the ratio of the size between the two circles.

A fifth document reference [5] very precisely describes all possible photogrammetry applications of coded targets, but does not specify a method of identifying these targets.

A sixth document reference [6] proposes a method for identifying objects with coded targets. This method is designed to maximise the number of different codes. This requires that acquisition conditions, i.e. the position between the target and the camera, should be controlled.

Automatic detection achieved in these documents according to prior art provides a means of precisely knowing the position of a point in a scene in an image or following this position during an image sequence and resetting the different images with respect to each other.

Considering the importance of having a tool capable of measuring the position of a point in a scene in an image, and despite current progress in computer vision, the purpose of the invention is to propose a system of coded targets comprising a target specification and a software part for recognition and precise positioning of targets in an image.

PRESENTATION OF THE INVENTION

Therefore, this invention proposes a coded target used in photogrammetry, the target being circular and comprising at least two concentric coding rings with at least two equal angular sectors, arranged around a central area comprising a central disk with a uniform colour surrounded by a first ring with a complementary colour, itself surrounded by a second ring the same colour as the central disk. Advantageously, all sectors in the first coding ring, which is the innermost ring, are the same colour except for one that is a complementary colour.

Two different colours, or two different light intensities, are qualified as being complementary colours. Coding of the targets in accordance with the invention is based on binary coding according to these two complementary colours.

Advantageously, the central disk is white or black. The second ring that surrounds the first ring surrounding the central disk is thinner than the first ring. Each sector in each ring is the same colour.

Advantageously, the target comprises a third coding ring, in which the colour of the sectors is complementary to the colour of the sector adjacent to the second coding ring.

In such a target, the central area (central disk and two rings) is used for fast detection of the target and precise positioning of its centre by a recognition software. The coding rings on each target are numbered in increasing order from the centre towards the outside by the said recognition software.

Advantageously, the set of coding rings has a specific coding which is invariable compared with rotations of the target.

The fact that all sectors of the first coding ring are the same colour except for one that is a complementary colour, means that the sector adjacent to the second ring surrounding the first ring can be denoted as being the first sector of this ring. Thus, numbering of sectors, for example by increasing order when rotating in the clockwise direction, is achieved unambiguously and without necessitating any external mark.

The function of the third coding ring is to achieve robustness to targets partially hidden by objects in the scene located between the view point and the target.

In the case of two coding rings each with n sectors, the coding according to the invention makes it possible to distinguish $2^{n+1}$ targets and is therefore more efficient than coding done according to prior art.

This invention also relates to a photogrammetry process using such specific coded targets and software for recognition of these targets on images, characterised in that it comprises the following steps:
 a step for fast detection of the central area of targets, giving an initial positioning of the targets on the image,
 a precise positioning step of the targets taking account of deformations due to perspective,
 a target identification step with identification of coding rings and their sectors, evaluation of the colours of the coding rings and management of hidden targets.

Advantageously, the detection step includes the following operations in sequence:
 use of an arresting filter, for example such as a Sobel filter or a Cany-Deriche filter, to calculate the gradients in X and in Y,
 calculate the normal to the gradient and its direction,
 calculate intersection and direction images,
 extraction of circles and ellipses, filtering by thresholding,
labelling,
filtering by regions.

Advantageously, the identification step includes the following operations for each target:
Adaptive segmentation,
Estimate of circle/ellipse deformations,
Regular sampling of rings,
Extraction of colour lists,
Filtering of lists,
Target identification,
management of hidden targets if necessary.

Targets according to the invention may advantageously be used in the industrial metrology field, and in the computer display field.

In general, the invention can be used for high precision in extraction of targets and good robustness to deformations related to acquisition, compared with existing methods and targets that may or may not be circular.

Compared with existing methods described in document references [1], [2] and [3], the targets according to the invention are very robust compared with projective distortions that are encountered as soon as the viewpoint of a scene is modified, the image plane of the camera not remaining parallel to the plane of the target. Secondly, the specifications of these coded targets provide a means of directly obtaining fast and precise algorithms resistant to brightness variations that frequently occur within the same image, and invariable on the scale of the target. Several sets of targets of different sizes can be considered depending on the target application, without any software changes or physical changes on the targets.

Unlike document reference [4], the approach according to the invention based on ratios of distances between the different rings (for the path of the rings and not for the code itself), does not use or require explicit knowledge of the diameters of the circles or knowledge of the calibration parameters (internal parameters) of the camera.

Unlike document reference [5], the invention relates to a process for identification and positioning of coded targets, which has a higher performance than methods briefly described in this document: due to the number of identifiable coded targets and the robustness of the method according to the invention under acquisition conditions due to the use of a first coding ring that will be used both for identification in orientation and coding.

In document reference [6], the target is circular with strips and the last ring is used to identify the different angular positions. In the case of the invention, a single angular mark is used to orient the target (first coding ring) and also to code the target (one additional coding bit). Furthermore, in the case of the invention, the different angular positions of the sectors are recovered from perspective deformations of the central area and not from marks uniformly positioned around the target as described in this document. Furthermore, the angular marking presented in this document significantly reduces the physically available space on the target on which the code can be marked. Therefore, the decoding software used is very different from the method according to the invention (presence of tables for angular positions, etc.).

DETAILED DESCRIPTION OF PARTICULAR EMBODIMENTS

In order to obtain good robustness to projective distortions and fast detection, targets according to the invention are circular and comprise several coding rings 10 and 11 placed around a central area 12.

Figure 1:
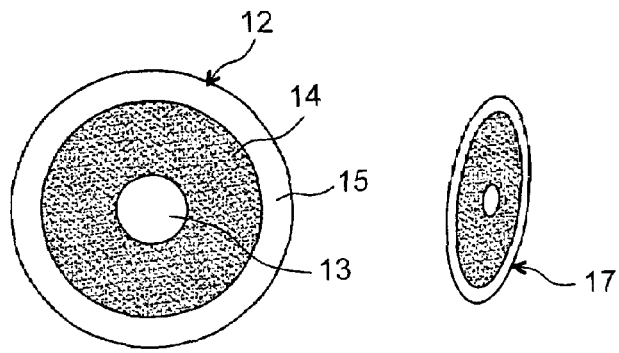
FIG. 1 illustrates a coded target according to the invention before and after projection of the target in the image.

This central area 12 is composed of a white disk 13 placed inside a black ring 14 which is itself surrounded by a white ring 15 as shown on FIG. 1. The detection and precise positioning steps of the target are made on this central area 13. A pattern with inverted colours could also be used, with a black disk 13 inside a white ring 14 surrounded by a black ring 15.

Figure 2:
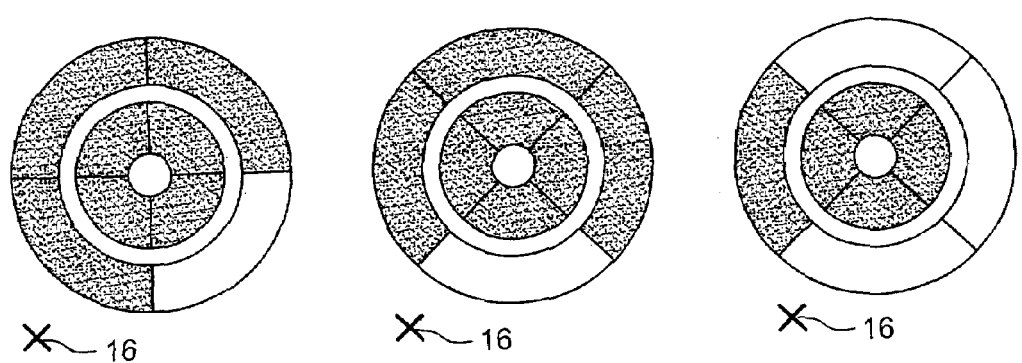
FIG. 2 illustrates invariance of the code of a circular target with four homogenous sectors per rotation.

Each coding ring is broken down into sectors with identical size and uniform colour. Coding is done on two colours (black and white, binary coding), to give good contrast and to achieve robustness to variations in lighting that can be large. Therefore, given the colour of each homogenous area, there are $2^n$ different targets. If a target containing a coding ring with n sectors were considered, it would not be useable since the coding thus made would not be invariable to target rotations. The first sector of the target will have to be identified to find the code corresponding to the target. A target can produce n different codes depending on the initial sector of the decoding algorithm, as shown on FIG. 2, in which the black cross 16 represents the starting point for reading the code.

Unlike the targets presented in document reference [3] in which each target is identified by n codes, and in order to keep a small number of coding sectors, a target according to the invention comprises a first coding ring 10 that is used to find the first sector of the target. All sectors on this coding ring 10 have the same colour except for one. This sector identifies the first sector of the coding ring 10 and subsequently the first sector of the second coding ring 11 and consequently is used to determine the orientation of the target.

Figure 3:
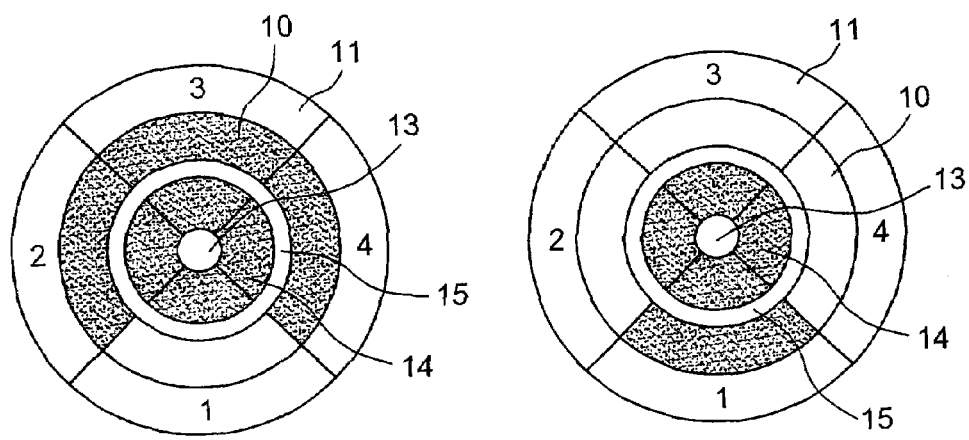
FIG. 3 illustrates a coded target according to the invention with four sectors, including marking of the first sector.

Two types of targets are obtained starting from the colour of this sector and therefore one coding bit more than with a target with n sectors and a single coding ring. With n different sectors and two coding rings, it is thus possible to visually and uniquely identify $2^{n+1}$ different targets, as shown for four sectors on FIG. 3.

The use of coded targets for a three-dimensional (3D) display application also introduces a constraint of robustness to hidden targets. Depending on the view point, an object can hide part of a target resulting in incorrect identification of the target. The addition of a third coding ring, the colours being inverted (the white becoming black and the black becoming white) from the colours in the second ring, makes it possible to detect such a situation.

Figure 4:
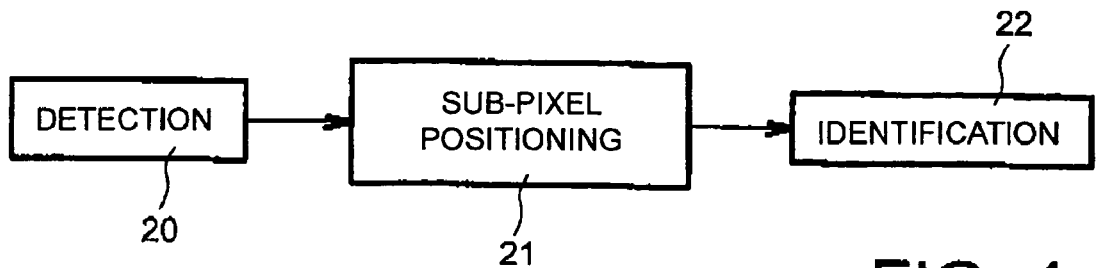
FIG. 4 illustrates the method of recognition of coded targets according to the invention.

The method of recognition of such coded targets is broken down into three steps carried out one after the other and illustrated on FIG. 4, namely:
  detection (step 20),
  sub-pixel positioning (step 21),
  identification (step 22).

The central area in each coded target in the image is found quickly in the first detection step. The position of the targets in the image is then refined in a fine positioning step, which also considers distortions related to the projection in the image. Finally, the last step determines the target identification starting from parameters of the ellipse, related to the projection 17 of the target in the image (see FIG. 1).

Target Detection Step

The purpose of this detection step 20 is to detect the presence of the central area 12 of a target in the image. This area, composed of a white disk surrounded by a black disk (or vice versa) will be deformed by projection into an ellipse 17 in the image as shown on FIG. 1.

The process according to the invention used to detect ellipses in the image is based on an accumulation algorithm adapted to the case of ellipses.

The first step is to calculate the gradient (modulus and direction) of the luminance of the image, or of the image obtained by processing the colours of the original image, using a conventional image processing technique (Deriche filter, Sobel filter, etc.). Two images are then created with a size identical to the input image: a direction image and an intersection image, initialised to zero.

At each point in the image for which the modulus is greater than a threshold (presence of a contour), a scan is made on the image along a straight line perpendicular to the contour (direction of the gradient given by the contour detection filter) over a configurable distance.

The value of each pixel in the intersection image corresponding to a pixel in the image scanned by this scanning ray is incremented by one unit, thus creating an accumulation image.

In parallel to this intersection image, an image called the direction image is generated which counts for each pixel the different directions encountered when scanning this pixel. This is done by discretising the orientations space of the gradient into 8 sectors as shown on FIG. 5. Each gradient orientation is then identified by the sector to which it belongs. When the scanning ray is emitted, the different orientations encountered among the eight possible orientations are identified in each pixel.

The coding used is such that an 8-bit binary coding can be used to determine the different directions encountered for a pixel, each direction corresponding to one bit assigned as soon as the direction is encountered.

Figure 5:
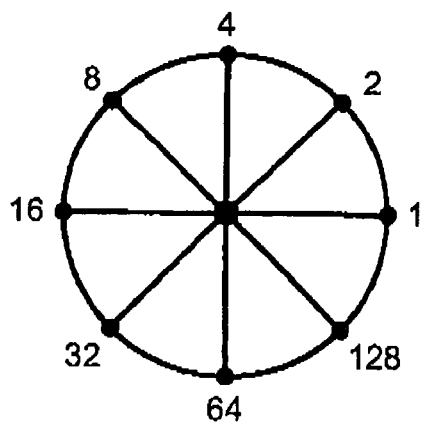
FIG. 5 illustrates the discretisation of directions in space, in the case of a circle.

If the case of a circle as illustrated on FIG. 5, starting from the contours of the circle and scanning in a direction perpendicular to the direction of the contour, the different scanned rays converge towards the centre of the circle, thus creating an accumulation point (high value of the intersection image). Secondly, the point corresponding to the centre of the circle of the intersection image contains the 8 possible directions, thus enabling detection of the presence of this circle in the image. A large number of circular region detection algorithms are based on similar algorithms.

Figure 6:
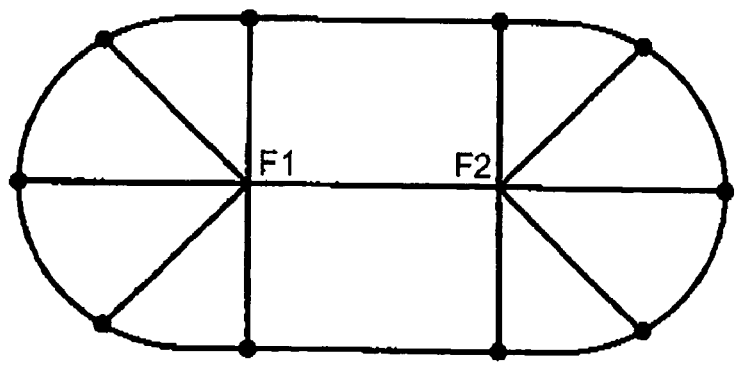
FIG. 6 illustrates the discretisation of directions in space, in the case of an ellipse.

In the case of an ellipse (projection of a circle in an image), two accumulation points appear at the two focal points F1 and F2 of the ellipse as shown on FIG. 6.

Targets can then be detected by detecting points with eight directions (for a perfect circle) and points with five consecutive directions and one perpendicular direction (for ellipses).

When such an algorithm is used on a scene containing several coded targets, these targets are quickly detected. But there is still a large number of false candidates. Two filters are applied in sequence to reduce the number of false candidates:
  by thresholding:
  If the centre of the target is white then all points detected with a grey shade that is too low will be deleted, and if it is black, then all points detected with a grey shade that is too high will be deleted. The threshold is fixed at a low value so that the results are not excessively sensitive to the results as a function of this threshold.
  By labelling the target:
  Labelling around each detected point provides a means of grouping all points with a similar light intensity. For each created area, only the centre of gravity corresponding to the centre of the circle is kept. When perspective deformations are not negligible, the position of the centre of the target in the image should then be calculated using perspective deformations: this is the purpose of the target positioning step 21.

Therefore, the method according to the invention provides a means of detecting centres of targets in the image, at a low calculation cost. All targets are detected, but a few false matches remain and must be processed later.

Figure 7:
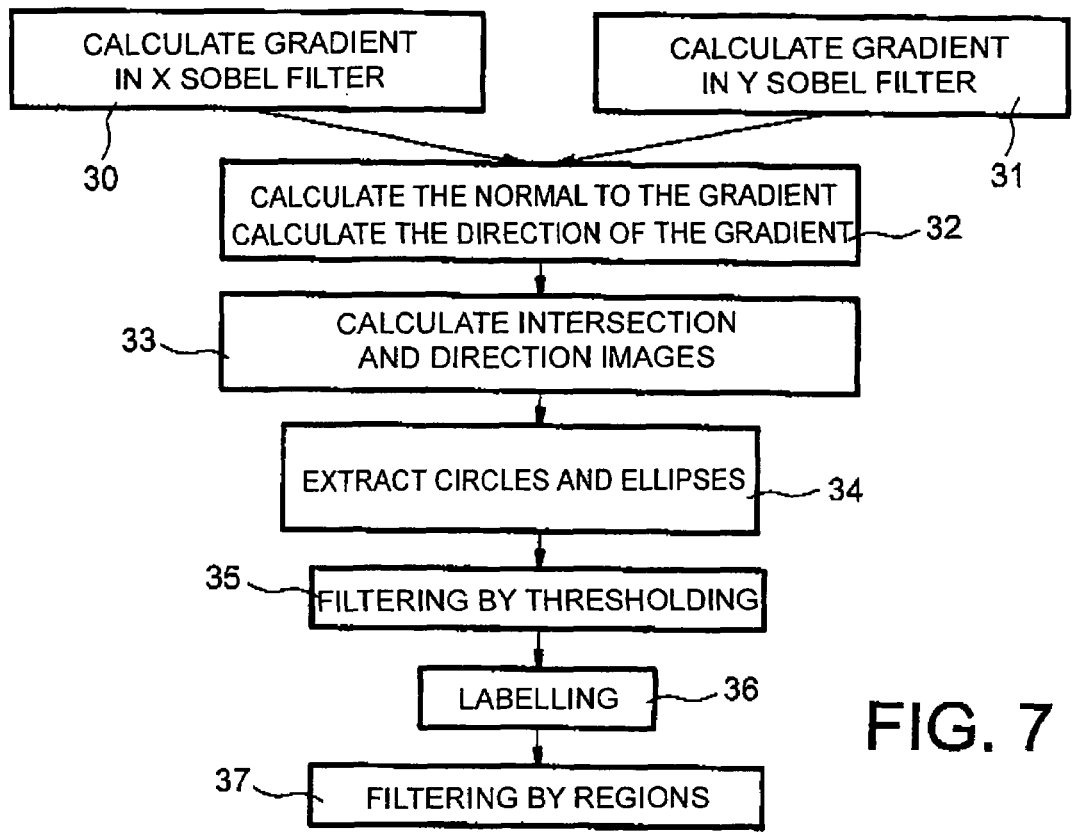
FIG. 7 illustrates the detection process according to the invention.

FIG. 7 summarises chaining of the different steps in the detection process.

Thus, we have the following in sequence:
  use an arresting filter, for example such as a Sobel filter or a Carry-Deriche filter to calculate gradients in X and in Y (steps 30 and 31),
  calculate the normal to the gradient and the direction of the gradient (step 32),
  calculate intersection and direction images (step 33),
  extract circles and ellipses (step 34),
  filtering by thresholding (step 35),
  labelling (step 36),
  filtering by regions (step 37).

At the exit from this algorithm, there will be a series of points corresponding to central areas of targets, but there may also be some false candidates.

Target Positioning Step

The purpose of this step 21 is to precisely estimate the position of the centre of targets in the image and distortions related to the perspective projection.

Two methods according to prior art are used to estimate deformations related to projection, either by sub-pixel detection, or by direct estimates of the ellipse parameters as described in document reference [2].

In this method, the equation for an ellipse is looked for in an arbitrary coordinate system $(0,\vec{i},\vec{j})$ knowing the centre of the ellipse $(m_x, m_y)$, the length of its a and b axes and its orientation given by the angle θ between the abscissas axis and its major axis.

Figure 8:
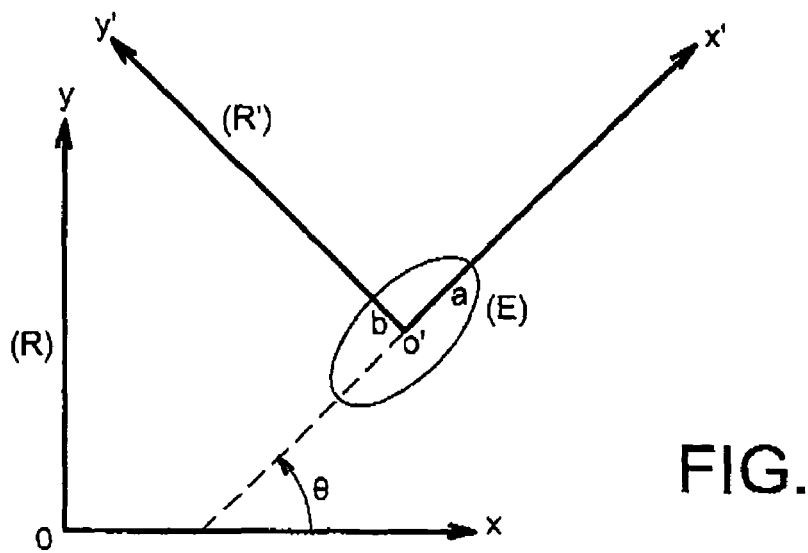
FIG. 8 illustrates a mark related to an ellipse.

To determine this equation, the coordinate system $(0', \vec{i}', \vec{j}')$ is used such that $0'=(m_x, m_y)$ and $\vec{i}', \vec{j}'$ are parallel to the major axis and the minor axis of the ellipse respectively, as shown in FIG. 8.

The equation of the ellipse (E) in the $(0', \vec{i}', \vec{j}')$ coordinate system is as follows:

$$\begin{bmatrix} x' = ax\ \cos(u) \\ y' = bx\ \sin(u) \end{bmatrix} \text{hence the equation } \frac{x'^2}{a^2} + \frac{y'^2}{b^2} = 1$$

Furthermore:

$$\begin{pmatrix} x' \\ y' \end{pmatrix} = R\theta\left(\begin{pmatrix} x \\ y \end{pmatrix} - Too'\right) =$$

$$\begin{pmatrix} \cos(\theta)\sin(\theta) \\ -\sin(\theta)\cos(\theta) \end{pmatrix}\begin{pmatrix} x-m_x \\ y-m_y \end{pmatrix} = \begin{pmatrix} \cos(\theta)(x-m_x) + \sin(\theta)(y-m_y) \\ -\sin(\theta)(x-m_x) + \cos(\theta)(y-m_y) \end{pmatrix}$$

Therefore, we get the following equation for the ellipse (E) in the coordinate system R:

$$\frac{(\cos(\theta)(x-m_x) + \sin(\theta)(y-m_y))^2}{a^2} + \quad (1)$$

$$\frac{(-\sin(\theta)(x-m_x) + \cos(\theta)(y-m_y))^2}{b^2} = 1$$

by setting $(E)=\tan(\theta)$ and observing that $$\frac{((x-m_x) + (y-m_y)E)^2}{a^2(1+E^2)} + \frac{((y-m_x) - (x-m_xE))^2}{b^2(1+E^2)} = 1 \quad (2)$$

we obtain:

$$\cos^2(\theta) = \frac{1}{1+E^2},$$

Figure 9:
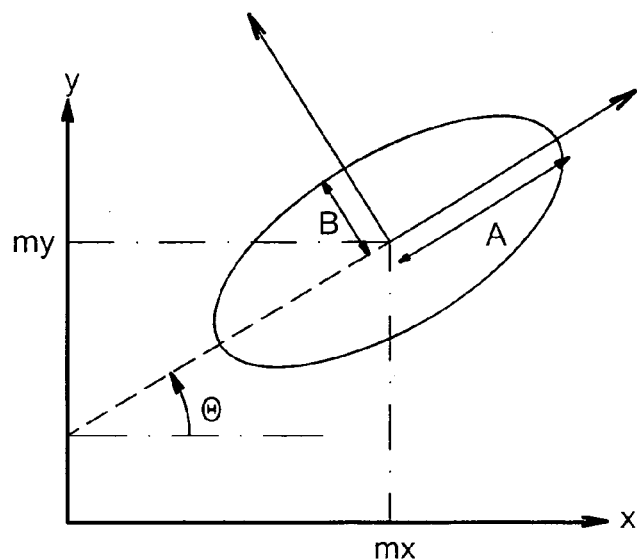
FIG. 9 illustrates the estimated parameters of the ellipse.

The previously estimated parameters can then be represented by FIG. 9.

Starting from the centre of gravity of the coded target, given by the detection step 20, we can search by sampling along straight lines for points belonging to the first ring, and starting from these points we can find the parameters of the ellipse and the precise (sub-pixel) position of the centre of the target in the image. When the search for points in the first ring is unsuccessful, the target is rejected (false detection).

At the end of this step 21, the parameters for each of the detected ellipses are available.

Target Identification Step

This step 22 itself is broken down into several steps:
Sampling of Points on Rings On a given straight line passing through the centre of the target, detecting the ends of the first ring 14 starting from the centre of the target provides a means of finding the points on the different coding rings by calculation of a dual ratio that is invariable by projection (in other words this ratio remains constant in every image of the target regardless of the view point).

Figure 10:
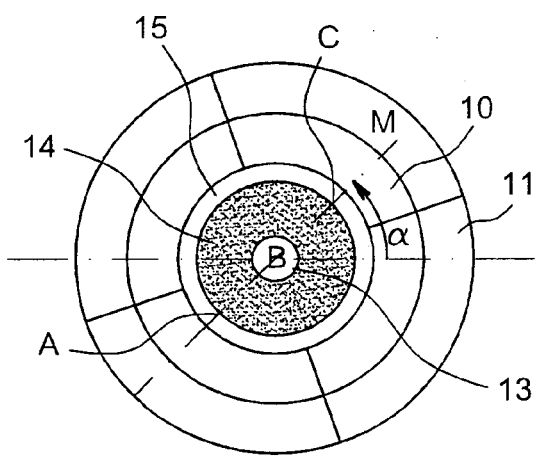
FIG. 10 illustrates the use of a projective invariable for sampling points on the different rings.

FIG. 10 shows elements necessary to search for a point M in a coding ring starting from the centre of the target, the point B, and the ends of the first ring 14 on the radius, points A and C.

The following relation can then be used to calculate the coordinates of point M:

$$\Pi_{ABCM} = \frac{\overline{MA}\cdot\overline{BC}}{\overline{BA}\cdot\overline{MC}}$$

where $\Pi_{ABCM}$ is a dual ratio, invariable by projection and independent of the choice of the straight line passing through the centre of the target. This dual ratio only depends on the ratio between the radius of the first ring 14 and the radius of the coding ring carrying M (known by construction of the target).

Identification is then made by sampling the straight lines orientation space (represented by the angle $\alpha$ on FIG. 10) to cover the entire coding ring.

The next section describes how to take account of elliptical deformations in order to make uniform sampling around the circle (see FIG. 11).

Uniform Sampling

The elliptical deformation due to the perspective projection of the target in the projection plane is taken into account by the use of a dual ratio when sampling points. Thus, the problem in this case does not consist of finding contour points of the spot, but rather to make an angular sampling adapted to perspective deformations.

The orientation, dimensions and centre of the ellipse are available. It is then possible to calculate the parameters (except for a scale factor) of the homographic deformation that transformed the central area of the target into an ellipse. This provides a means of estimating the position of each point of the disk after projection. All that is necessary then to uniformly sample the coding rings of the target is to select points at a uniform spacing on the initial disk and then to project them in the image.

Figure 11A:
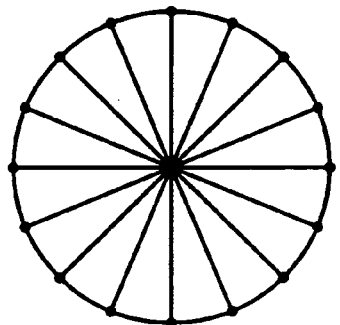
FIGS. 11A and 11B illustrate a selection of points for regular sampling.
Figure 11B:
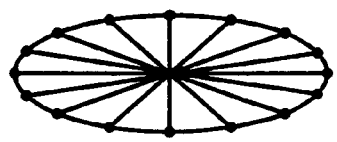

FIG. 11A illustrates a reference model. FIG. 11B illustrates an ellipse obtained after perspective projection.

Figure 12:
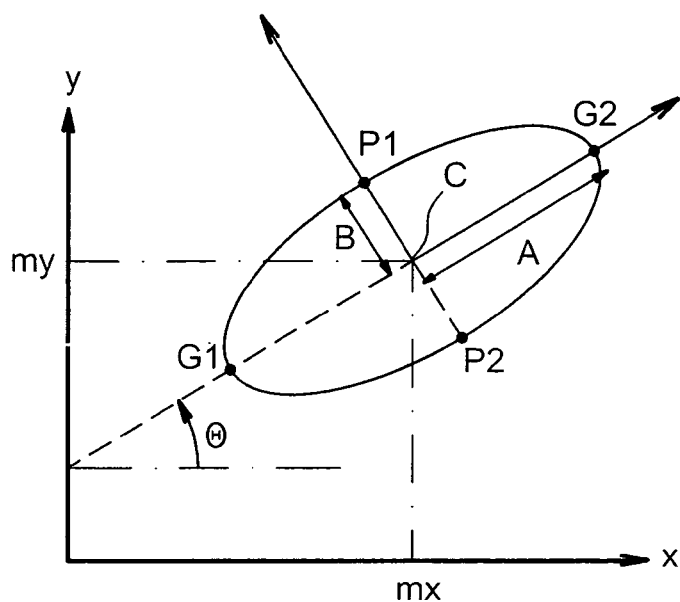
FIG. 12 illustrates the representation of characteristic points of the ellipse.

Points on the reference model are projected onto the ellipse, and the first step is to calculate the coordinates of the vertices of the ellipse. The coordinates of five points characteristic of the ellipse P1, P2, G1 and G2 and C as illustrated on FIG. 12 are then known.

The next step is to use dual ratio pairs (projective invariable) to calculate the coordinates of the sample points. It is possible to adapt the method described in the single-dimensional case (dual ratio on aligned points) to deal with the two-dimensional case. This is equivalent to calculating a homography, except for a rotation factor. But in this case, the calculation of two dual ratios is more efficient (direct use of parameters of the ellipse).

Figure 13:
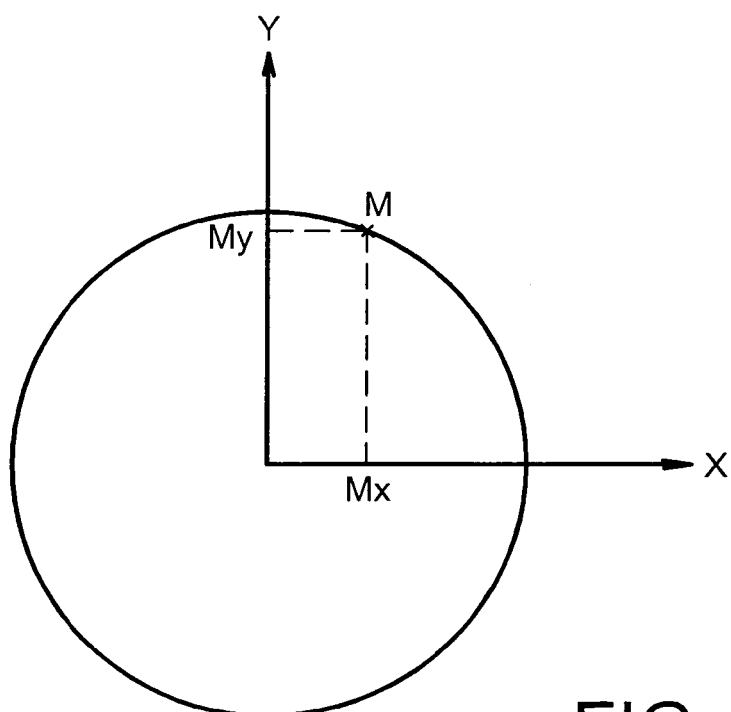
FIG. 13 illustrates the search for the coordinates of a point M using its components.

More precisely, a point M is found by calculating a dual ratio for its projection $M_x$ onto the abscissas axis and a dual ratio for its projection $M_y$ onto the ordinates axis, as illustrated on FIG. 13.

The method based on dual ratios can then be used to find projections of points $M_x$ and $M_y$ in the image. Knowing the orientation of the ellipse and its centre, the local coordinate system attached to the ellipse can then be used to determine the coordinates of point M.

Therefore, this method is a good means of uniformly sampling the contours of an ellipse with the same shape as the central disk of the target, except for a scale factor, and therefore finding the different coding rings.

Adaptive Segmentation

Depending on the lighting, the light intensities or "grey shades" corresponding to the black areas and the white areas on the target may vary significantly.

For each target detected in this way, an adaptive segmentation algorithm is used to determine the grey shade corresponding to the black areas and the grey shade corresponding to the white areas.

A method according to known art is used based on the analysis of the histogram for the area considered. The histogram represents the number of pixels with a given grey shade. The method searches for two modes M1 and M2 (maxima) on this histogram and for the optimum threshold separating the two classes of pixels.

Figure 14A:
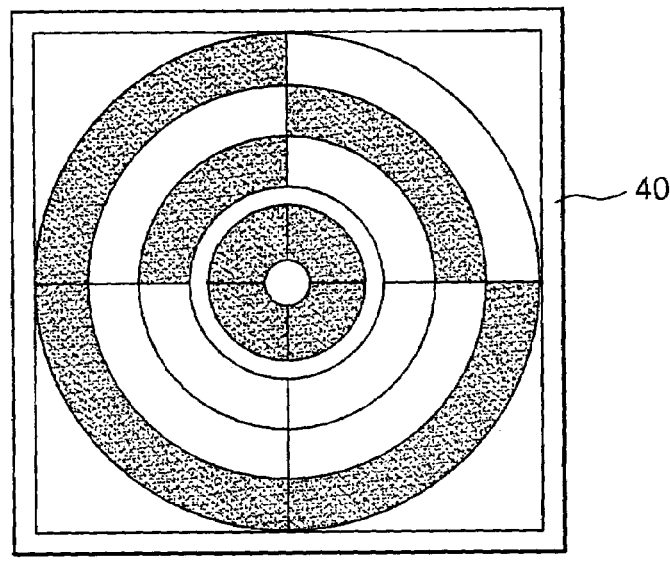
FIGS. 14A and 14B illustrate a given target and an example of a bimodal histogram obtained from the target.
Figure 14B:
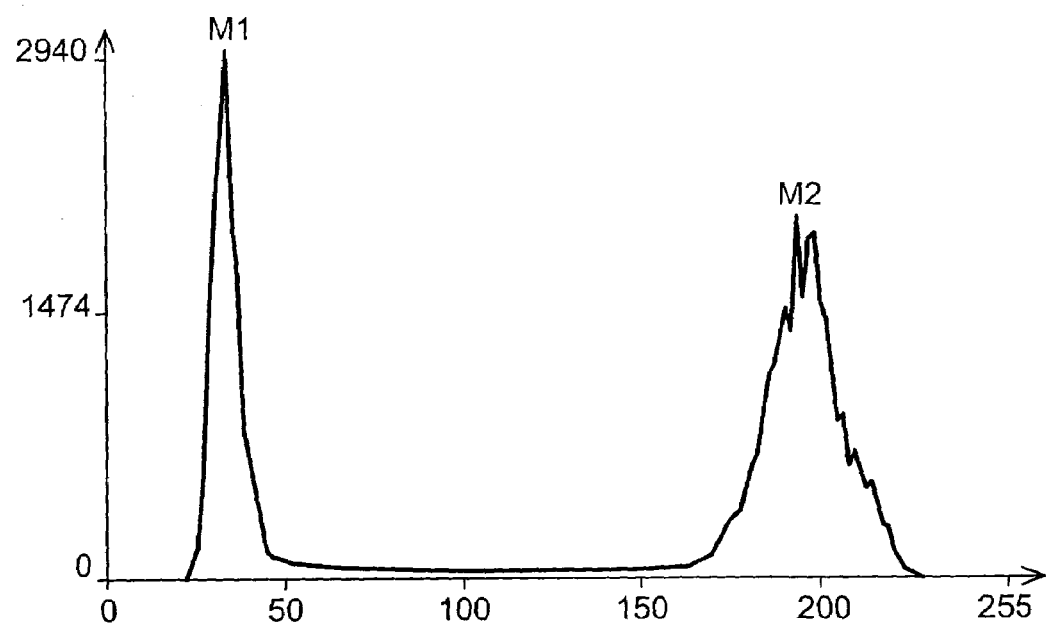

FIG. 14 illustrates a case used to obtain a dual-mode histogram. The histogram (FIG. 14B) of the area contained in the square 40 (FIG. 14A) is calculated.

The method segments grey shades of the histogram into two classes by varying the threshold separating these classes. This threshold is optimised iteratively until a threshold defined as being the optimum threshold is obtained.

Therefore, this method is capable of estimating grey shades, in other words light intensities, of black and white pixels making up a coded target.

Identification Algorithm

The use of the above algorithms provides a means of obtaining a list of regularly sampled points in each of the coding rings. The adaptive segmentation algorithm provides a means of knowing the colour of each of these points directly from the light intensity.

The result obtained is thus lists of "colours" corresponding to the intensities of points informally sampled along coding rings.

A median filter is used on lists of "colours" to achieve some robustness to noise (the intensity of a point is determined from the intensity of n of its neighbours).

The next step is to search in the list of "colours" corresponding to the first coding ring to determine the positions of two black/white transitions of this ring. If there are more or less than two transitions in this ring, the target is considered as being invalid.

Otherwise, the position of the centre of the minority "colour" sector is calculated in the list of sampled points. This gives a good approximation of the orientation of the target. Due to this position, it is then possible to calculate the "colour" of the sector of the second coding ring adjacent to the minority sector of the first ring (sector 1 in FIG. 3). The next step is to advance successively by quarter of the length of the list to obtain the "colour" of the other three sectors (sectors 2, 3 and 4 in FIG. 3). The result is identification of each coded target.

Management of Hidden Targets

It is therefore possible to detect and identify coded targets in the images. The problem of hidden coded targets still has to be solved. It frequently happens that a target is partially hidden by an object in the scene when this scene is observed from several very different points of view. This hidden target must then be detected, to avoid making an identification error.

Figure 15:
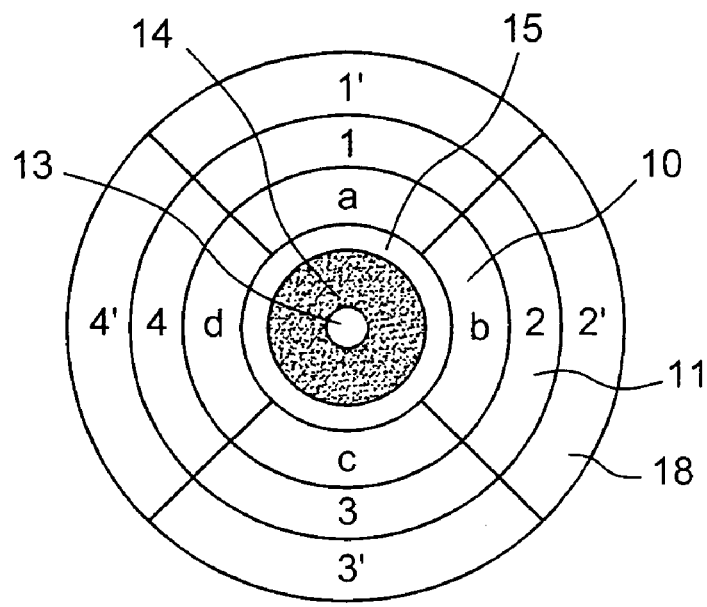
FIG. 15 illustrates the addition of a third coding ring for the management of hidden targets.

It is decided to add a third coding ring 18 to the previously used coded targets, as illustrated on FIG. 15.

In coding this type of targets, the same constraints are applied on the sectors of the two inner coding rings 10 and 11. We also impose that the colour of sectors 1', 2', 3' and 4' in the third coding ring are the inverse of the colour of sectors 1, 2, 3 and 4 in the second coding ring 11.

Figure 16:
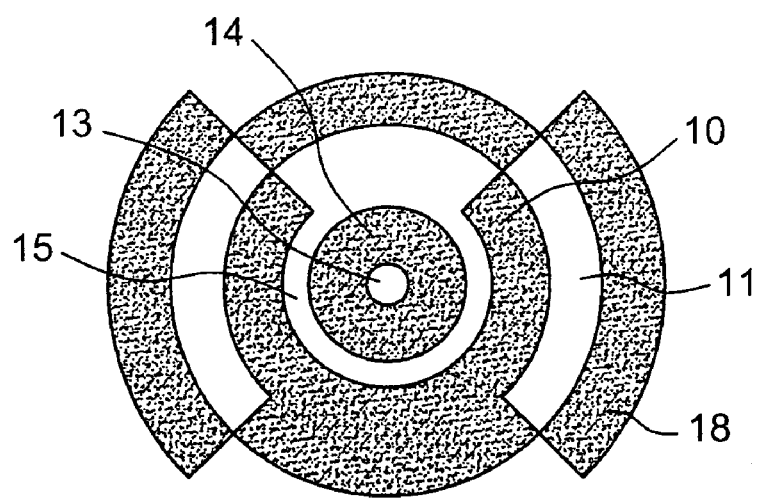
FIG. 16 illustrates an example coded target with which problems of hidden targets can be managed.

If this constraint is not respected, most targets hidden by objects in the scene can be identified. FIG. 16 shows an example of such a coded target.

Figure 17:
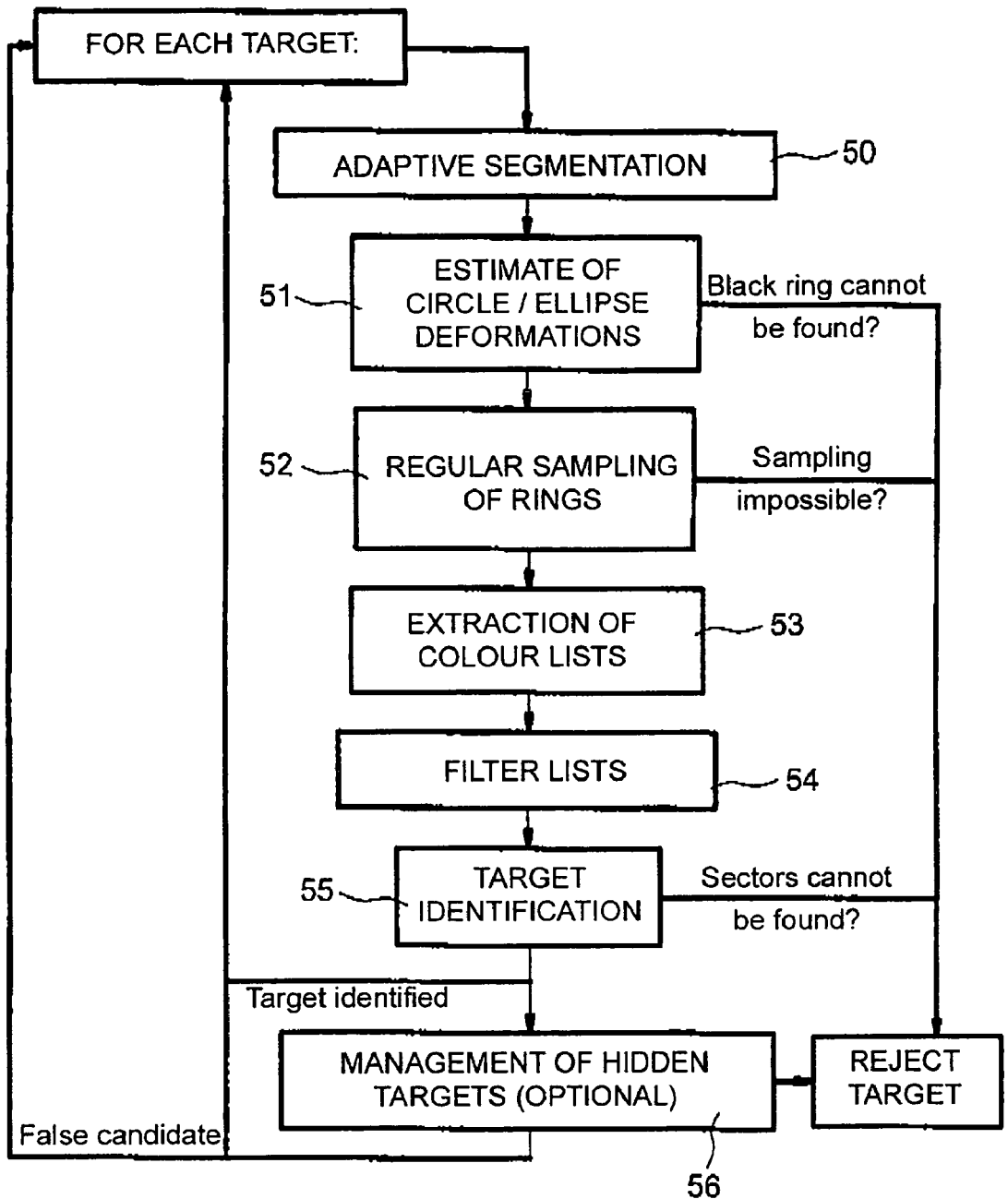
FIG. 17 illustrates the identification process according to the invention.

FIG. 17 illustrates the different sub-steps in the identification step.

For each target, the step include:
Adaptive segmentation (step 50),
Estimate of circle/ellipse deformations (step 51),
Regular sampling of rings (step 52),
Extraction of colour lists (step 53),
Filtering of lists (step 54),
Target identification (step 55),
possibly management of hidden targets (step 56).

The method according to invention provides a means of obtaining results robust to projective distortions independently on the scale of the targets used, robust to hidden targets, and robust to lighting changes.

REFERENCES

[1] Ahn S. J. and Schultes M. "A new circular coded target for the automation of photogrammetric 3D-surface measurements" (Optical 3-D Measurement Techniques IV: Applications in architecture, quality control, robotics, navigation, medical imaging and animation. Heidelberg: Wichmann, 1997, pages 225-234).

[2] Ganci Guiseppe and Handley Harry. "Automation in videogrammetry" (International Archives of Photogrammetry and Remote Sensing, Hakodate 32 (5), pages 53-58, 1998).

[3] Knyaz Vladimir A. and Sibiyakov Alexander "Non contact 3D Model Reconstruction Using Coded Target", (8th International Conference on Computer Graphics and Visualisation, Moscow, 1998).

[4] U.S. Pat. No. 5,911,767
[5] WO 97/31336
[6] U.S. Pat. No. 5,554,841

The invention claimed is:

1. A coded target used in photogrammetry, the target being circular and comprising:
at least first and second concentric coding rings with at least two equal angular sectors, arranged around a central area comprising a central disk with a uniform color surrounded by a first ring with a complementary color, the first ring surrounded by a second ring of a same color as the central disk, wherein all sectors in the first coding ring, which is an innermost coding ring, are the same color except for one that is a complementary color.

2. The target according to claim 1, wherein the central disk is white or black.

3. The target according to claim 1, wherein the second ring is thinner than the first ring.

4. The target according to claim 1, wherein each sector in each ring of the first and second rings is the same color as an adjacent sector within that ring.

5. The target according to claim 1, further comprising a third coding ring, in which color of the sectors is complementary to the color of the sector adjacent to the second coding ring.

6. A photogrammetry process using specific coded targets according to claim 1, and software for recognition of these targets on images, which comprises:
detection of the central area of targets, giving an initial positioning of the targets on the image;
positioning of the targets taking account of deformations due to perspective; and
identification of coding rings and their sectors, evaluation of the colors of the coding rings and management of hidden targets.

7. The process according to claim 6, wherein the detection includes following operations in sequence:

use of one of an arresting filter as a Sobel filter or a Cany-Deriche filter, to calculate gradients in X and in Y,
calculate a normal to the gradient and its direction,
calculate intersection and direction images,
extraction of circles and ellipses,
filtering by thresholding,
labelling,
filtering by regions.

8. The process according to claim 6, wherein the identification includes following operations for each target:

Adaptive segmentation,
Estimate of circle/ellipse deformations,
Regular sampling of rings,
Extraction of color lists,
Filtering of lists,
Target identification.

9. The process according to claim 8, wherein the identification further includes management of hidden targets.

* * * * *